United States Patent [19]

Tuchiya

[11] 3,735,149

[45] May 22, 1973

[54] OPERATIONAL CIRCUIT

[75] Inventor: Kiyoshi Tuchiya, Minato-ku, Tokyo-to, Japan

[73] Assignee: Nippon Electric Company, Limited, Tokyo, Japan

[22] Filed: July 1, 1971

[21] Appl. No.: 158,793

[52] U.S. Cl. ....................307/230, 307/251, 328/142

[51] Int. Cl. ....................G06g 7/12

[58] Field of Search....................307/205, 251, 279, 307/304, 229, 230; 328/142, 143, 144, 145; 330/9

[56] References Cited

UNITED STATES PATENTS

| | | | |
|---|---|---|---|
| 3,473,043 | 10/1969 | James | 307/304 |
| 3,463,993 | 8/1969 | Beck | 307/238 |
| 3,566,145 | 2/1971 | Goodale | 307/251 |
| 3,521,141 | 7/1970 | Walton | 307/304 |
| 3,529,251 | 9/1970 | Edwards | 307/304 |
| 3,502,905 | 3/1970 | Bicking | 307/251 |
| 3,140,408 | 7/1964 | May | 308/143 |
| 3,506,922 | 4/1970 | Hannaver | 307/246 |

OTHER PUBLICATIONS

Korn "Analog/Hybrid Computations" pages 1843–1846, Vol. 54, No. 12, December, 1966.

*Primary Examiner*—John W. Huckert
*Assistant Examiner*—R. E. Hart
*Attorney*—Richard C. Sughrue, Gideon Franklin Rothwell, John H. Mion et al.

[57] ABSTRACT

Disclosed herein are a variety of operational circuits each including an operational amplifier with a plurality of feedback loops. Each of the feedback loops as well as the circuit inputs are connected to the operational amplifier through a high impedance input terminal forming part of a feedback loop switching circuit. The switching circuit includes a field effect transistor circuit, the high impedance input terminals comprising the gate electrodes of the field effect transistors. Signals in the feedback circuits are selectively applied to the inputs of the operational amplifier by selectively shorting each of the feedback loops to ground potential. The selective shorting is accomplished by using bipolar transistors placed in a conductive state by control signals.

7 Claims, 10 Drawing Figures

Patented May 22, 1973

3,735,149

2 Sheets-Sheet 1

INVENTOR
KIYOSHI TUCHIYA

BY Sughrue, Rothwell, Mion, Zinn & Macpeak
ATTORNEYS

OPERATIONAL CIRCUIT

BACKGROUND OF THE INVENTION

This invention relates to operational circuits capable of handling analog data and more specifically to operational circuits which are utilized as integrating circuits, track and hold circuits, variable gain amplifiers and the like. The invention finds particular application in analog computers, analog memories used in pattern recognition systems, and various kinds of measuring devices used in communication systems.

DESCRIPTION OF THE PRIOR ART

FIG. 1 shows a conventional integrating circuit. This integrating circuit is described in "Electronic Analog and Hybrid Computers," page 18, FIG. 19, published in 1964 by McGRAW-HILL BOOK COMPANY INC.

The circuit illustrated comprises an operational amplifier 10, an input resistor Ri connected to an input terminal *a* (namely, a virtual ground point) of the operational amplifier 10, an integrating capacitor Cf, and a resistor 14 used to compensate for the offset voltage produced in the amplifier 10.

Generally in a negative feedback amplifier such as amplifier 10, the voltage $e_o$ appearing at an output terminal 15 is represented by the following equation.

$$e_o = -(Zf/Zi)\ e_i \ldots\ldots\ldots\ldots \quad (1)$$

wherein $Z_i$ : input impedance $Z_f$ : feedback impedance

Using Equation 1 the output voltage $e_o$ of the circuit of FIG. 1 takes the form:

$$e_o = -\ 1/Ri{\cdot}Cf\ e_i dt + k = -\ (1/Cf)\ i_{in} dt + k\ \ldots \quad (2)$$

wherein $i_{in}$: input current equal to $e_i/Ri$ $k$ : initial value (i.e., value of $e_o$ in the reset state)

Thus, when operating as an integrator, integration is performed by charging the integrating capacitor Cf with the input current $i_{in}$ determined by the input voltage $e_i$ and input resistance *Ri*. In order to provide a highly accurate integrating circuit, the input impedance of the operational amplifier 10 must be high to prevent the current from flowing in the amplifier 10.

In practical integrating circuits, switching means is provided to switch the circuit into a resetting mode of operation to dissipate the charge stored on the capacitor Cf as a result of a previous integrating operation and to provide the capacitor with an initial charge prior to the next integrating operation. However, prior integrating circuits which include switching means have presented problems due to difficulties in preventing leakage current flow and spike noise introduced into the signal circuit from the control circuit which controls the switch means.

For instance, it is often necessary for the predetermined transfer characteristic of an integrating circuit to be modified by an external control signal. As has been mentioned above, the integrating circuit must be capable of being reset to ready itself for a subsequent integrating operation after a previous one has ended. To switch between the integrating and resetting modes, electronic switches are often used. However, these switches cause offset voltage, leakage current and spike noise to be introduced into the signal circuit from the control circuit. To help prevent these problems it has been the practice to take great care in selecting the switching elements used and the method of driving the control signal. As a result, the integrating circuit has become complicated.

FIG. 2 shows a circuit diagram of a conventional integrating circuit interconnected with a switching circuit. FIGS. 3A and 3B are equivalent circuits corresponding to the circuit of FIG. 2 respectively in the resetting and integrating modes of operation. The integrating circuit shown in FIG. 2 is disclosed in a paper titled "Progress of Analog/Hybrid Computation," page 1,844, FIG. 9, published in "Proceedings of the IEEE," Vol. 54, No. 12, December, 1966.

The integrating circuit in FIG. 2 comprises an operational amplifier 20, an input resistor 26 used to assist in the generation of an initial potential across capacitor 23 in the reset mode, a feedback resistor 27, field effect transistors 28 and 29 (hereinafter referred to as the FET switches) used for switching between the integrating and resetting operations, bipolar transistors 21 and 22 (hereinafter referred to as the Tr switches) employed to short circuit the signal loop, to which each is coupled, to ground potential, an integrating capacitor 23, a resistor 24 for compensating for the offset voltage produced in the amplifier 20, voltage limiting resistors 30 and 31 and input resistors 32.

The FET switches 28 and 29 are effectively used for controlling the integrating circuit, because the current flowing from respective gate terminals $G_{28}$ and $G_{29}$ of these FET switches 28 and 29 to other electrodes is too small to produce the offset voltage. These FET switches 28 and 29 operate in a complementary relationship. More specifically, control signals A and $\bar{A}$ are supplied to the FET switches 28 and 29 so that one of the switches is turned ON while the other is turned OFF. The Tr switches 21 and 22 are controlled by the control signals A and $\bar{A}$ through the resistors 30 and 31, respectively. These switches 21 and 22 operate in a complementary manner with respect to the FET switches 28 and 29, respectively. That is, when switch Tr 22 is ON, FET switch 29 is OFF. Similarly, when switch Tr 21 is ON, FET switch 28 is OFF.

The integrating circuit in FIG. 2 operates as shown in FIGS. 3A and 3B, when suitable control signals are supplied thereto. More specifically, FIG. 3A shows the integrating circuit operating in the reset mode. In FIG. 3A, $R_{FET}$ denotes the ON resistance of the FET switch 29, which has been set to the ON state by a control signal $\bar{A}$. $R_F$ denotes the ON resistance of the Tr switch 21. The value of the ON resistance $R_F$ can be controlled to be within 1 to 5 ohms, and is negligible. In this circuit, the leakage resistances of FET switch 28 and Tr switch 22 in their OFF states are omitted. A voltage $e_{11}$ proportional to the desired initial potential to be placed across capacitor 23 is multiplied by a gain coefficient (feedback resistance 27/input resistance 26) determined by the resistor 26 and the resistor 27. The resultant voltage $e_{10}$ appears at an output terminal 25 as an output of the operational amplifier 20. Most of this output is applied to the integrating capacitor 23 since the ON resistance $R_F$ is very small.

When the circuit is switched to the integrating state, the switches 21, 28, 22 and 29 in FIG. 2 invert their respective operating states, thereby forming a circuit as shown in FIG. 3B. Under this condition, the feedback loop which includes the resistor 27 is broken and the resistor 27 appears as a load impedance for the amplifier 20. The integrating operation is performed in a manner similar to that explained with respect to FIG.

1. Therefore, a description of the integrating operation of the circuit shown in FIG. 3B is omitted herein.

In the resetting and integrating modes of operation, the FET switches 28, 29 and Tr switches 21, 22 are employed to switch between the two modes of operation under the control of suitable control signals A and $\bar{A}$. To control the ON and OFF modes of the FET switches 28 and 29, it is necessary to control the amplitude of the voltage applied to their respective gate terminals $G_{28}$ and $G_{29}$. For example, if each of the FETS 28, 29 has an N-type channel, it is generally required that a voltage of +4V to +6V with respect to the voltage at the source terminal be fed to the gate terminal to turn the FET switch ON. In addition, in order to place the FET switch 28 in the OFF state, a large negative voltage, such a −6V, with respect to the source terminal must be supplied to the gate terminal. As a result, the signal for controlling the FET switches 28 and 29 must have a total amplitude of about 10V.

As is known, there is inter-electrode capacitance between the terminals of the FET as shown in FIG. 4. The control signal is applied to the operational amplifier 20 through a capacitance $C_A$ between the gate and source and via a capacitance $C_B$ between the gate and drain as shown in FIG. 4. The relatively high switching potentials acting on the inter-electrode capacitances cause spike noise when switching between the resetting and integrating modes of operation. The spike noise may be superimposed on the initial potential across capacitor 23 causing error.

SUMMARY OF THE INVENTION

It is an object of this invention to provide an operational circuit so that the above-mentioned disadvantages of the conventional operational circuit are eliminated.

The operational circuit of this invention comprises an operational amplifier with means having a plurality of input terminals to which negative feedback signals are applied from the amplifier. These input terminals present a high input impedance to the operational amplifier. Further, a feedback circuit is connected to each of the input terminals and at least one switching means is connected between the input terminals and a ground conductor so that a desired one of the feedback circuits is selected.

DETAILED DESCRIPTION OF THE PREFERRED EMBODIMENTS

The present invention will now be described in detail in connection with the accompanying drawings.

Figure 5:
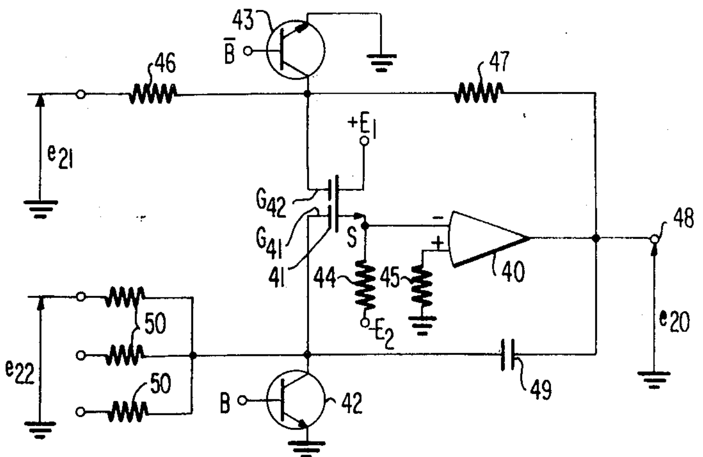
FIG. 5 illustrates a first embodiment of this invention as applied to an integrating circuit.

FIG. 5 illustrates a first embodiment of the invention as applied to an integrating circuit. The circuit includes an operational amplifier 40, a field effect transistor 41 (hereinafter abbreviated to FET 41) capable of presenting a high input impedance state to the amplifier 40 and having a plurality of gate electrodes $G_{41}$ and $G_{42}$, bipolar transistors 42 and 43 (hereinafter referred to as Tr switches 42 and 43) used to selectively connect the feedback loops to ground potential, power sources $+E_1$ and $-E_2$, a load resistor 44 to provide a bias voltage to FET 41, a resistor 45 to compensate for the offset voltage produced in the amplifier 40, an input resistor 46, a feedback resistor 47 and an integrating capacitor 49.

In FIG. 5, amplifier 40 need not have a high input impedance in that such a high impedance is provided by the switching circuit. This advantage is obtained from the fact that the drain current can be controlled from either gate terminal $G_{41}$ and $G_{42}$ (or Substrate) in FET 41 to which are applied the inputs to the operational amplifier.

Figure 6:
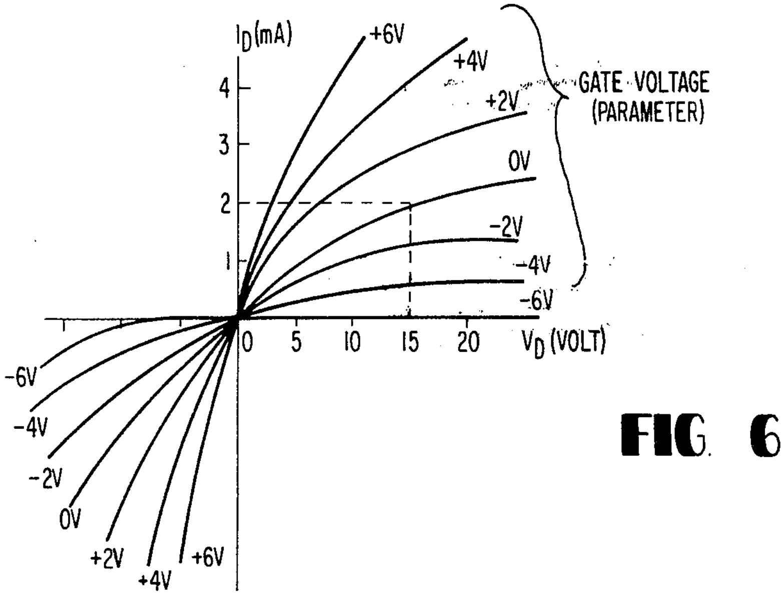
FIG. 6 illustrates the characteristic curve of a field effect transistor which may be employed in this invention.

The resetting operation of the integrating circuit is disclosed as follows. The control signals B and $\bar{B}$ are applied so that the Tr switch 42 may be turned ON and Tr switch 43 OFF (in the complementary relationship). When the Tr switch 42 is in the ON state, ground potential is applied to input terminal $G_{41}$. At this time, since Tr switch 43 is in the OFF state, an output $e_{20}$ is fed back to the input through the feedback resistor 47. Likewise, the gate terminal $G_{42}$ stands at the virtual ground potential, even if an input voltage $e_{21}$ for providing initial potential to capacitor 49 is applied to the resistor 46. In other words, a potential, close to ground potential is applied to both gate terminals $G_{41}$ and $G_{42}$. It is assumed that the operating point of FET 41 conforms to the characteristic curve in FIG. 6 and is applicable to both the gate terminals $G_{41}$ and $G_{42}$. Under this condition, when a voltage of +15V ($+E_1$) is supplied to the drain of the FET 41, and a voltage of −15V ($-E_2$) is fed to the load resistor 44 and when the value of the load resistor 44 is determined so that the drain current $I_D$ may become 2 mA, FET 41 can linearly operate at a nearly zero bias voltage applied between the source S and the gate terminal $G_{41}$ or $G_{42}$. If the bias current which is required for operating the amplifier 40 is smaller than the drain current (2mA), a 7.5K ohms resistor may be used as load resistor 44. The FIG. 6 characteristic curves of the field effect transistor is described in a paper titled "Introduction to Field Effect Transistor" appearing in "Field Effect Transistors Physics, Technology and Applications," Sec. 1—1, Page 5, FIG. 1-5 published in 1966 by Prentice-Hall Inc.

With the FET switch 41 biased at approximately zero volts between gate $G_{42}$ and source S, the initial input $e_{21}$ is multiplied by a gain coefficient (resistor 47/resistor 46) determined by the resistors 46 and 47. After this operation, the output $e_{20}$ is produced at terminal 48 of the amplifier 40. This output is applied to the integrating capacitor 49 and thus the circuit operates in a manner equivalent to the operation of the circuit of FIG. 2 operating in its resetting mode as described with respect to FIG. 3A.

In the integrating operation, when the Tr switch 42 is placed in the OFF state, and when Tr switch 43 is set to the ON state, a feedback loop which includes the capacitor 49 is formed. As a result, terminal $G_{41}$ of FET 41 stands at the virtual ground potential. At the same time, the terminal $G_{42}$ stands at ground potential, thus causing the circuit to be in its integrating mode of operation. In this mode, a voltage $e_{22}$ applied to an input resistor 50 is integrated by the capacitor 49 in a manner similar to that disclosed with respect to the circuit of FIG. 1. During the integrating operation, the operating point of FET 41 is not much difference from the operating point used during circuit reset mode, because in the integrating mode of operation, terminal $G_{41}$ stands at the virtual ground potential, and the terminal $G_{42}$ stands at ground potential. Therefore, FET 41 operates as a linear element at the same operating point in spite of the resetting or integrating operation. Thus, the FET 41 is actuated at the same operating point, the input applied to the FET 41 being the very small value called virtual ground potential.

The Tr switches 42 and 43 are bipolar transistors with the same polarity (NPN bipolar transistors in FIG. 5), and ON/OFF control is performed by permitting or preventing base current flow in these transistors. This means that transistors 42 and 43 can be controlled by low control voltages. In other words, the control signals $\overline{B}$ and B can be made very low. For example, when silicon transistors are used for the Tr switches 42 and 43, the base voltages in the ON state become about 0.6 to 0.8 V with respect to the emitter voltages. It is also easy to switch an ON transistor to its OFF state by making the base voltage equal to the emitter voltage. In the integrating circuit using the operational circuit of the invention, very low control voltages are applied to the integrating circuit in comparison with that in the prior art. As a result, the spike noise produced at the switching time between the resetting and integrating operations can be greatly reduced. Because the input terminals $G_{41}$ and $G_{42}$ are the gate terminals of FET 41, it is possible to perfectly isolate these terminals from each other DC-wise. Thus, no leakage current flows in the integrating capacitor 49 from one end of the feedback loop, and integrating operation can be performed with high accuracy. The integrating circuit in FIG. 5 may be applied to an analog computer or various measuring means for using the communication system.

Figure 7:
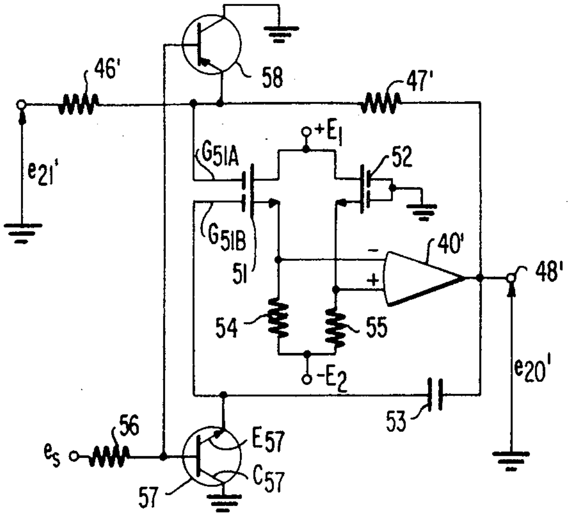
FIG. 7 shows a second embodiment of this invention applied to a track and hold circuit.

FIG. 7 shows a circuit diagram of a second embodiment of the invention. This embodiment has particular application to track and hold circuits or sample and hold circuits. The operational circuit comprises an operational amplifier 40', field effect transistors 51 and 52 (hereinafter referred to as FET 51 and 52) capable of providing a high input impedance to the amplifier 40' and having a plurality of input gates (gate electrodes), an NPN bipolar transistor 57 and a PNP bipolar transistor 58 (hereinafter referred to as Tr switches 57 and 58) used for short-circuiting the signal loops to ground potential, a voltage limiting resistor 56, a holding capacitor 53, an input resistor 46', and a feedback resistor 47'. The circuit elements indicated by prime are identical to those indicated by the corresponding numerals in FIG. 5 (A description of these identical circuit elements is omitted).

Figure 1:
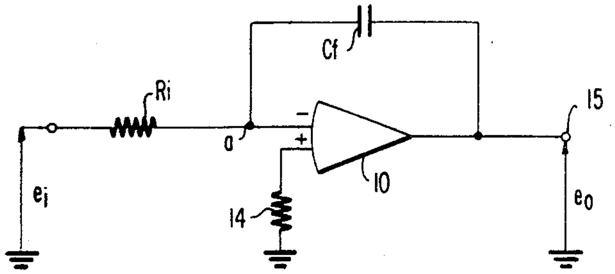
FIG. 1 PRIOR ART
FIG. 1 shows a circuit diagram for a conventional integrating circuit with an operational amplifier.
Figure 2:
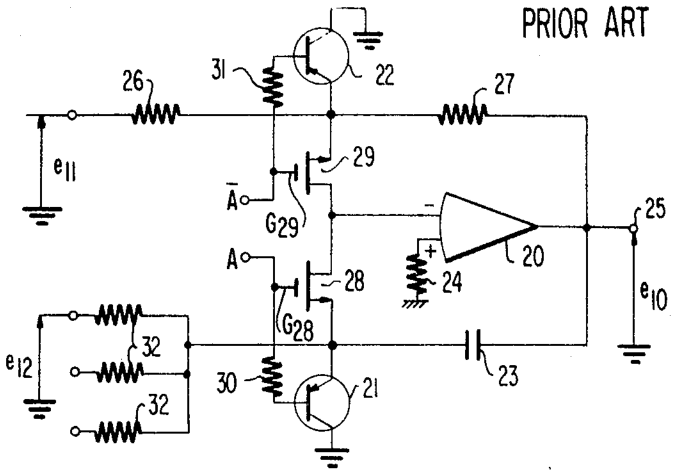
FIG. 2 PRIOR ART
FIG. 2 shows a circuit diagram for a conventional integrating circuit which includes a switching circuit.
Figure 4:
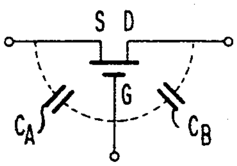
FIG. 4 shows a diagram of the spike noise causing inter electrode capacitances of an FET.
Figure 3A:
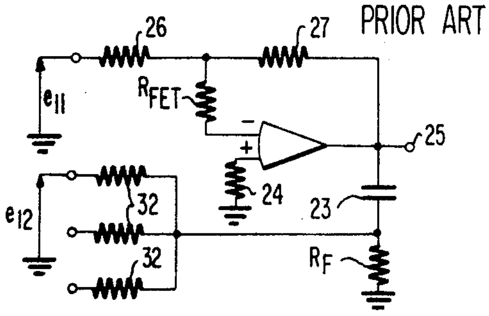
FIG. 3A PRIOR ART
FIG. 3A is an equivalent circuit diagram of the circuit of FIG. 2 during a resetting operation.
Figure 3B:
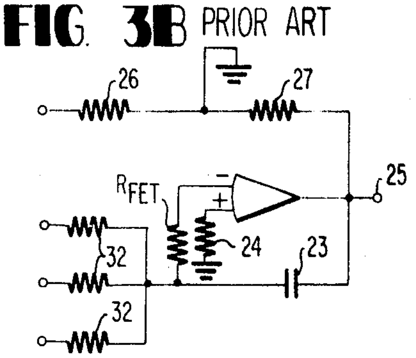
FIG. 3B PRIOR ART
FIG. 3B is an equivalent circuit diagram of the circuit of FIG. 2 during an integrating operation.
Figure 8:
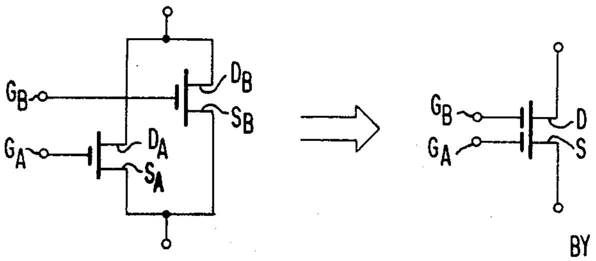
FIG. 8 shows a diagram of an FET circuit having a plurality of gate input terminals for use in this invention.

The track and hold circuit operates to track the input voltage $e_{21}$ at the output terminal 48' during the track mode and to hold the output substantially constant during the hold mode. It is so arranged that one of the Tr switches 57 and 58 turns ON when the other turns OFF. In addition, the same switching operation may be realized when a PNP transistor is used for the Tr switch 57, and when a NPN transistor is used for the Tr switch 58. Also, the Tr switches 57, 58 may be transistors having the same polarity as shown in FIG. 5. Each of the FET's, 51 and 52, has two input terminals and is composed of two single-gate field effect transistors in which the source electrodes $S_A$ and $S_B$ of these two single-gate transistors are connected to each other. Similarly the drain electrodes $D_A$ and $D_B$ are connected to each other as shown in FIG. 8. The FET's 51 and 52 are combined with the operational amplifier 40' in the above-mentioned manner. Therefore, an operational amplifier having a plurality of the same polarity input terminals $G_{51A}$ and $G_{51B}$ is realized. The FET's 51 and 52 can be easily manufactured by integrated circuit techniques.

In FIG. 7, resistors 54 and 55 connected to the source terminals of FET's 51 and 52 respectively are load resistors and the FET's 51, 52 are the field effect transistors characteristically equivalent to the FET 41 in FIG. 5. In the circuit of FIG. 7, the resistance of the load resistors 54 and 55 may be equal to the resistor 44 in FIG. 5 and the power source voltages may be equal to that of the circuit of FIG. 5. In FIG. 7, ground potential is supplied in common to the plurality of gate electrodes of field effect transistor 52. Furthermore, a bias voltage for compensating for the offset voltage may be applied to the gates of the field effect transistor 52.

The tracking operation of the above-mentioned circuit is described as follows. When a positive control signal $e_s$ is applied to the circuit through the resistor 56, the Tr switch 57 turns ON state. The base voltage of the Tr switch 57 is restricted by the forward voltage drop across its emitter-base. For example, if a silicon transistor is used for the Tr switch 57, the base voltage will be about 0.6V to 0.8V. Accordingly, the Tr switch 58 (PNP Tr switch) is brought to the OFF state, because the voltage between the base and other electrodes is backward biased. Thus, a feedback loop which includes the resistor 47' is formed. In this circuit, the voltage $e_{21}$ applied to the input resistor 46' is multiplied by a gain coefficient (resistance 47'/resistance 46') determined by the resistors 46' and 47' and appears as an output at the terminal 48'. At the same time, this output is fed to the capacitor 53. As a result, the tracking operation is carried out in the same manner as in the resetting operation in FIG. 5.

The holding operation functions as follows. First, a control signal $e_s$ is supplied to the circuit through the resistor 56, and the Tr switch 58 is set to the ON state. When a silicon transistor is employed as the Tr switch 58, the base voltage is restricted to a value −0.6 to −0.8V. Consequently, the Tr switch 57 is placed in the OFF state, and a feedback loop is formed which includes capacitor 53. In this state, the final value of the tracking operation is stored in the capacitor 53 and, therefore, the output voltage of the circuit at the output terminal 48' is held constant.

Generally, deterioration of the holding function depends on the leakage current flowing into the branch circuit connected to the input terminal $G_{51A}$ of FET 51. However, utilizing the circuit of this invention, the holding function is not deteriorated because the branch circuit on the side of input terminal $G_{51A}$ is perfectly isolated from that on the side of input terminal $G_{51B}$. In other words, the input terminals of FET 51 maintain a high input impedance characteristic. In the operational circuit of this invention, the desirable holding function can be maintained for the following two reasons:

(1) In the holding state, the Tr switch 57 is OFF. Therefore, the collector terminal $C_{57}$ stands at ground potential, and similarly, emitter terminal $E_{57}$ stands at the virtual ground potential. For this reason, no leakage current flows. (2) the voltage between the collector and base in the Tr switch 57 is backward biased at a small voltage within the 0.6 to 0.8 V range, and thus the collector-base impedance is larger, greatly reducing leakage current. Also, from the illustration in FIG. 5, it is apparent that the holding operation of FIG. 7 may be replaced by the integrating operation and that the operational circuit in FIG. 7 can be used as an integrating circuit if the input resistor 50 of FIG. 5 is connected to the gate terminal $G_{51B}$ of FET 51 of FIG. 7. The above-mentioned track and hold circuit in FIG. 7 may be used as an analog memory and finds particular applicability in a pattern recognition system.

Figure 9:
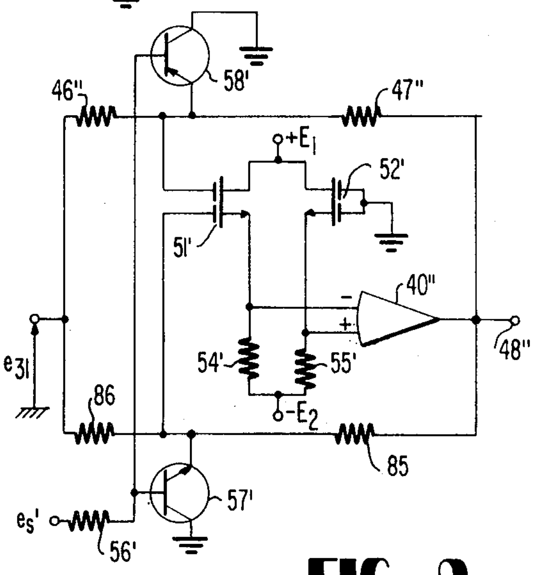
FIG. 9 illustrates a third embodiment of this invention applied to a variable gain amplifier.

FIG. 9 shows the third embodiment of this invention applied to a variable gain amplifier wherein the integrating capacitor 49 in FIG. 5 is replaced by a feedback resistor 85. When a Tr switch 57' is ON, a feedback loop is formed which includes a resistor 47, and an input $e_{31}$ is multiplied by a gain coefficient determined by an input resistor 46 and a feedback resistor 47 and is obtained as an output at an output terminal 48 of the circuit. If a Tr switch 58' is turned ON while Tr switch 57' is turned OFF, the previous feedback loop is broken and a feedback loop which includes a feedback resistor 85 is formed. Therefore, the input signal at $e_{31}$ is multiplied by a gain coefficient (resistor 85/resistor 86) determined by the resistor 85 and an input resistor 86 and is obtained as the output at the terminal 48 of the circuit. This means that by suitably determining the gain factor, the operational circuit of the present invention can operate as a preamplifier having a desired variable gain. For example, the operational circuit may be employed as a preamplifier to adjust two input signals which are applied to an A-D converter, if the two input signals are widely different from each other. Also, the circuit may be used as analog signals switching means when it is so arranged that two different inputs are supplied to the resistors 86 and 46, respectively.

In FIG. 9, the circuit elements indicated by single prime and double prime are identical to those indicated by the corresponding numerals in FIGS. 5 and 7 (For these circuit elements no additional description is given herein).

In the embodiments mentioned in FIGS. 5, 7, and 9, the operational circuits having two gate electrodes have been explained. However, when the circuit arrangement as shown in FIG. 8 is employed in each of the circuits, the number of electrodes may be increased and thus the operational circuit of this invention is available for a multiplexer.

According to this invention, as has been mentioned above, switch means for selecting a feedback loop is added to an operational amplifier having a plurality of the same polarity input terminals. Therefore, the circuit is simplified, the spike noise produced at the time when the feedback loop is switched is decreased, and easy switching operation among more than two transfer characteristic is performed. In short, the operational circuit of this invention is highly practical and applicable to various circuits.

The invention has so far been described in conjunction with specific embodiments. It would be apparent however that a number of alternatives and modifications can be made within the scope of the present invention defined by the appended claims.

What is claimed is:

1. In an operational circuit which includes an operational amplifier, a plurality of feedback circuits and a switching circuit for selectively coupling said feedback circuits between the output of said operational amplifier and the input thereof, the improvement comprising;

a field effect transistor switching circuit including a plurality of high impedance input means connecting said plurality of feedback circuits to the input of said operational amplifier, said high impedance input means comprises gate electrodes of the field effect transistors, and switching means for causing feedback signals in selected feedback circuits to control the input signals to said operational amplifier.

2. The operational circuit of claim 1 wherein said switching means includes switching transistors, coupled to said gate electrodes, said circuit further comprising control terminal means coupled to said switching transistors for selectively placing at least one of said switching transistors into a state of conduction to thereby block signals in the feedback circuit associated with the gate electrode coupled to the conducting transistor from controlling the input signals to said operational amplifier.

3. The operational circuit of claim 2, wherein said plurality of feedback circuits comprise a first feedback circuit including a first resistance means and a second feedback circuit including a capacitor said first and second feedback circuits being connected to first and second gate electrodes, said operational circuit further including, a first input terminal coupled through a second resistance means to said first gate electrode.

4. The operational circuit of claim 3 further including a second input terminal coupled through a third resistance means to said second gate electrode.

5. The operational circuit of claim 4 wherein said switching transistors are bipolar transistors, a first and second bipolar transistor being coupled to first and second gate electrodes, each of said bipolar transistors comprising a base, an emitter, a collector, the base of said bipolar transistors being coupled to said control terminal means for causing the selective switching of said bipolar transistors, the collector-emitter circuits of said bipolar transistors being connected to the first and second gate electrodes.

6. The operational circuit of claim 1 wherein said high impedance input means comprises at least first and second field effect transistors each comprising a gate, source, and drain electrodes, the source and drain electrodes of one of said field effect transistors being coupled respectively to the source and drain electrodes of the other of said field effect transistors, each of said plurality of feedback circuits being connected to a gate electrode of one of said field effect transistors.

7. The operational circuit of claim 2 wherein said operational circuit is a variable gain amplifier, said plurality of feedback circuits comprising a first feedback circuit including a first resistance means coupled to a first gate electrode and a second feedback circuit including a second resistance means coupled to a second gate electrode, third and fourth resistance means coupled respectively to said first and second gate electrodes and input terminal means coupled to said third and fourth resistance means.

* * * * *

UNITED STATES PATENT OFFICE

CERTIFICATE OF CORRECTION

Patent No. 3,735,149 Dated May 29, 1973

Inventor(s) Kiyoshi Tuchiya

It is certified that error appears in the above-identified patent and that said Letters Patent are hereby corrected as shown below:

In The Specification:

Column 6 line 4 - "$\epsilon_{21}$" should be -$e_{21}$'- column 6 line 49 - '$e_{21}$" should be -$e_{21}$'- column 7 line 33 - "47" should be -47"- column 7 line 35 - "46" should be -46"- column 7 line 35 - "47" should be -47"- column 7 line 37 - "48" should be -48"- column 7 line 43 - "48" should be -48"- column 7 line 53 - "46" should be -46"-

Signed and sealed this 20th day of November 1973.

(SEAL)
Attest:

EDWARD M.FLETCHER,JR.
Attesting Officer

RENE D. TEGTMEYER
Acting Commissioner of Patents